(12) United States Patent
Tanaka et al.

(10) Patent No.: US 7,442,906 B2
(45) Date of Patent: Oct. 28, 2008

(54) INDUCTION HEATING COIL FOR SHAFT MEMBER HAVING MULTIPLE STEPS AND HEATING METHOD

(75) Inventors: Yoshimasa Tanaka, Hiratsuka (JP); Takeshi Endoh, Hiratsuka (JP); Yutaka Kiyosawa, Hiratsuka (JP); Fumiaki Ikuta, Atsugi (JP); Takashi Horino, Hiratsuka (JP); Masayuki Komatsu, Kawasaki (JP); Jun Fujie, Toyoake (JP); Takeshi Yoshikawa, Kariya (JP)

(73) Assignee: Neturen Co., Ltd., Tokyo (JP)

( * ) Notice: Subject to any disclaimer, the term of this patent is extended or adjusted under 35 U.S.C. 154(b) by 249 days.

(21) Appl. No.: 10/553,802

(22) PCT Filed: Apr. 8, 2005

(86) PCT No.: PCT/JP2005/006960

§ 371 (c)(1),
(2), (4) Date: Aug. 15, 2006

(87) PCT Pub. No.: WO2005/107324

PCT Pub. Date: Nov. 10, 2005

(65) Prior Publication Data

US 2007/0000916 A1    Jan. 4, 2007

(30) Foreign Application Priority Data

Apr. 28, 2004    (JP) ............................. 2004-132305

(51) Int. Cl.
*H05B 6/10*    (2006.01)
*H05B 6/44*    (2006.01)
*C21D 1/10*    (2006.01)

(52) U.S. Cl. ...................... 219/639; 219/635; 219/674; 219/672; 266/129; 148/572

(58) Field of Classification Search ............... 219/639, 219/640, 635, 672, 674, 676; 266/129; 156/572–573; 148/572–573
See application file for complete search history.

(56) References Cited

U.S. PATENT DOCUMENTS 3,596,037 A * 7/1971 Seulln et al. ............... 219/676

FOREIGN PATENT DOCUMENTS

JP    60-9820    1/1985

(Continued)

*Primary Examiner*—Philip H Leung
(74) *Attorney, Agent, or Firm*—Sughrue Mion, PLLC

(57) ABSTRACT

In an induction heating coil for heating a shaft member having multiple steps, annular conductors are separately disposed in the axis direction, the annular conductors having inner diameters so as to form predetermined gaps with outer peripheries of heating portions of the shaft member, the lengths of annular conductors (1, 2, and 3) are set so that the areas of the respective heating portions are approximately equal to each other, and the annular conductors are connected to each other in series, so that the respective step shaft portions of the shaft member are uniformly heated. The annular conductors described above may be formed to have shapes in conformity with the shapes of the heating portions of the shaft member and may be formed to have a step shape corresponding to steps of the shaft member having different outer diameters. In addition, at least one annular protrusion is provided for at least one of the annular conductors at a place corresponding to a root of a step of the shaft member so as to heat the root of the shaft.

4 Claims, 2 Drawing Sheets

FOREIGN PATENT DOCUMENTS

| JP | 8-171982 A | 7/1996 |
| JP | 11162626 | 6/1999 |
| JP | 2000-68043 A | 3/2000 |
| JP | 2002-47515 A | 2/2002 |

* cited by examiner

INDUCTION HEATING COIL FOR SHAFT MEMBER HAVING MULTIPLE STEPS AND HEATING METHOD

TECHNICAL FIELD

The present invention relates to an induction heating coil and heating method using the same, the induction heating coil being used, for example, for induction hardening of a shaft member having many steps.

BACKGROUND ART

Heretofore, in induction hardening of a shaft member having multiple steps, a method has been performed in which hardening is performed by heating using an annular heating coil corresponding to each step or each set of steps of the shaft, followed by cooling. However, by the above conventional method, there have been problems in that the cost is increased due the complication thereof, and root portions of the steps are not easily heated up.

Accordingly, as an induction heating coil which solves the above problems, a heating coil has been disclosed in Patent Document 1.

[Patent Document 1] Japanese Unexamined Patent Application Publication No. 11-162626

DISCLOSURE OF INVENTION

The heating coil disclosed in the above patent document 1 heats up the surface of a shaft by a linear conductor extending along the axis direction as shown in FIG. 3, and since many steps of the shaft can all be collectively hardened by heating using only one coil, the hardening is efficient.

However, by the heating coil of the patent document 1, since the increases in temperature of the individual steps in heating are different from each other, a problem occurs in that heating time becomes longer in order to obtain a uniform temperature. When the heating time is increased, there is a shortcoming in that hardening deformation is increased. In addition, since heating is performed using the conductor extending along the axis direction, it is difficult to apply a large amount of electrical power, and when the length of the axis is increased, the heating time is further increased, and as a result, there has been a problem in that the heating efficiency is decreased. Furthermore, since the amount of cooling water for cooling the heating coil is restricted, the electrical power to be applied thereto is unfavorably limited due to the increase in temperature of the heating coil, or since the strength of the coil tends to decrease due to its own structure, the service life of the coil is disadvantageously shortened.

Accordingly, a coil has been desired which can perform rapid and short-time heating by applying a large amount of electrical power so as to decrease the hardening deformation and which has a superior structural strength so as to increase the service life.

Hence, an object of the present invention is to solve the problems described above and to provide a long-life induction heating coil for heating a shaft member having multiple steps, the coil being capable of improving the heating efficiency and decreasing the hardening deformation through a rapid and short-time heating performed by applying a large amount of electrical power.

To the end, an induction heating coil for heating a shaft member having multiple steps and a heating method, according to the present invention, comprises: annular conductors separately disposed in the axis direction and having inner diameters which form predetermined gaps with outer peripheries of heating portions of the shaft member, in which the lengths of the annular conductors are set so that the areas of the respective heating portions are approximately equal to each other, and the annular conductors are connected to each other in series so as to uniformly increase temperatures of respective step shaft portions of the shaft member.

As described above, since heating is performed using the annular conductors as a heating coil for heating the shaft member having multiple steps instead of using a linear conductor, a large amount of electrical power can be applied as compared to that disclosed in the patent document 1 in which the linear conductor extending in the axis direction is used, so that the hardening deformation can be decreased by a short-time heating. In addition, the amount of cooling water can be increased, and as a result, the service life of the coil can be increased.

On the other hand, when one annular conductor which is not divided is used for heating individual step shaft portions of the shaft member having multiple steps, a large diameter portion is not easily heated as compared to a small diameter portion, and as a result, the increase in temperature of the large diameter portion becomes slow. Hence, in the present invention, in order to uniformly increase temperatures of the individual step shaft portions, the annular conductors are connected in series in which the lengths thereof in the axis direction are set so that areas of the respective heating portions are approximately equal to each other. That is, when the annular conductors are connected in series, currents passing through the individual annular conductors are equal to each other; hence, in order to obtain uniform increase in temperature, the length of the large diameter annular conductor in the axis direction is decreased to increase the current density, and the length of the small diameter annular conductor in the axis direction is increased to decrease the current density. The number of the annular conductors and the lengths thereof in the axis direction are determined by experience and experimental data based on the shape of the shaft member to be heated.

At least one of the annular conductors is preferably formed to have a step shape corresponding to steps of the shaft member which have different outer diameters so as to uniformly increase temperatures of the above step shaft portions of the shaft member. By the structure as described above, the number of the annular conductors can be decreased, and a shaft having many steps can be uniformly heated.

In addition, at least one annular protrusion is preferably provided for at least one of the annular conductors at a place corresponding to a root of a step of the shaft member so as to heat up the root of the step. By the structure described above, since current is concentrated at the root portion of the step, heating hardening can be performed to the bottom of the root.

In the present invention, the shaft member having multiple steps includes, besides a shaft member having smooth surface steps, a shaft in which some steps thereof have machined a shape such as a gear, a serration, and a spline shape. In addition, the shape and the inner diameter in conformity with the shape and the outer diameter of the heating portions of the shaft member mean that for example, when a shaft portion is not straight but is tapered, the inner diameter of the annular conductor is also tapered, and when being provided to correspond to at least two steps of the shaft member, the annular conductor is also formed so that the inner diameter thereof has a step so as to conform with the steps described above.

When the induction heating coil for heating a shaft member having multiple steps, according to the present invention, is used, the temperatures of the individual steps of the shaft member can be uniformly increased, and as a result, the heating time can be decreased. Hence, the heating efficiency is improved, and thereby energy saving can be achieved. In addition, since a large amount of electrical power can be applied, short-time heating can be performed, and as a result, hardening deformation can be decreased. Furthermore, since the coil has a superior strength because of its own structure, and a large amount of cooling water can be used, the increase in temperature of the coil is small, the service life of the coil can be increased, and hence the cost can be reduced.

Figure 1:
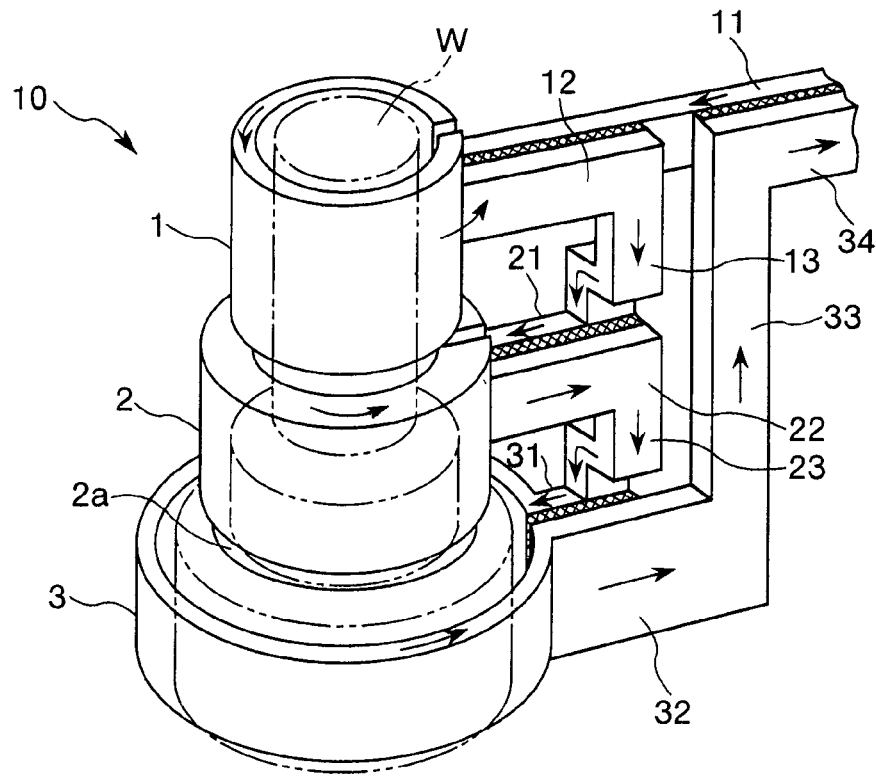
FIG. 1 is a perspective view of an induction heating coil for heating a shaft member having a multiple steps, according to an embodiment of the present invention, the coil being formed by connection of conductors in series.

REFERENCE NUMERALS 1 upper annular conductor, 2 middle annular conductor, 3 lower annular conductor, 10 induction heating coil, 11, 12, 21, 22, 31, 32, 34 lead portion, 13, 23, 33 longitudinal lead portion, W work (shaft member to be heated)

BEST MODE FOR CARRYING OUT THE INVENTION

Hereinafter, an induction heating coil for heating a shaft member having multiple steps, according to the present invention, will be described in detail with reference to a first embodiment shown in figures. FIG. 1 is a perspective view showing an induction heating coil composed of annular conductors disposed in series, according to the present invention, and FIG. 2 is a cross-sectional view thereof.

Hereinafter, with reference to the figures, the structure of the induction heating coil of the present invention will be described, the coil being used for heating a shaft member having three steps. As shown in FIG. 2, a shaft member (hereinafter referred to as "work") W to be heated of this embodiment is a shaft member having three steps: a small diameter portion W1, a middle diameter portion W2, and a large diameter portion W3. The diameters and the lengths of the steps described above are d1×h1+d2×h2+d3×h3, respectively.

Figure 2:
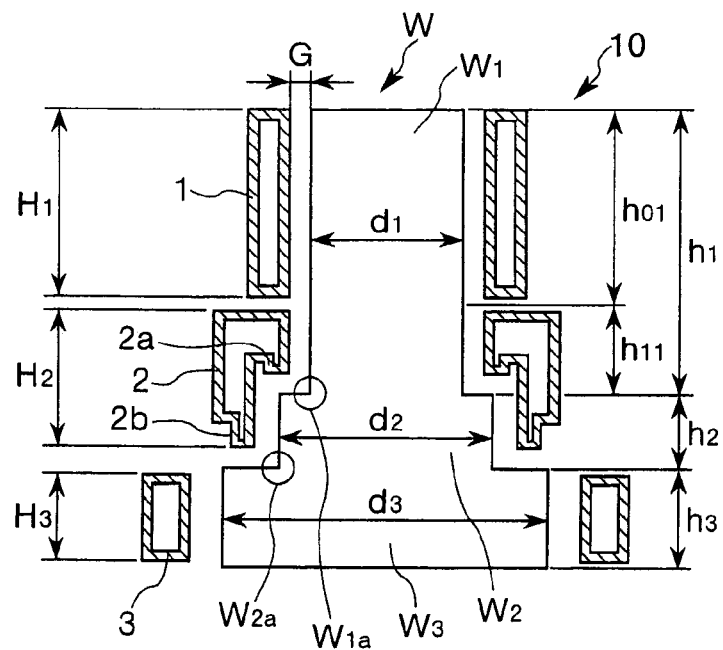
FIG. 2 is a cross-sectional view of an induction heating coil for heating a shaft member having multiple steps, according to an embodiment of the present invention.

In FIG. 2, an induction heating coil 10 is composed of three annular conductors 1, 2, and 3 which are an upper, a middle, and a lower annular conductor separately disposed in the axis direction. The three annular conductors 1, 2, and 3 are connected to each other in series and have inner diameters to form a predetermined gap G with the outer periphery of the work W therebetween. The upper annular conductor 1 heats up a part of the small diameter portion W1 in the region indicated by h01 in the longitudinal direction. The middle annular conductor 2 that is one of the conductors heats up two steps including a lower part of the small diameter portion W1 and the middle diameter portion W2, so that the region indicated by a length (h11+h2) shown in FIG. 2 is heated. For this heating, the inner periphery of the middle annular conductor 2 has a step shape forming the gap G with a heating portion therebetween. In addition, the middle annular conductor 2 has a protrusion portion 2a at a place corresponding to a root portion W1a of the small diameter portion W1 and a protrusion portion 2b at a place corresponding to a root portion W2a of the middle diameter portion W2. By the structure described above, insufficient increase in temperature at root portions of the shaft is prevented. The lower annular conductor 3 heats up the large diameter portion W3 in the region indicated by a length h3.

In the induction heating coil 10 shown in FIG. 1, a heating power supplied from a lead portion 11 of the upper annular conductor reaches a lead portion 21 of the middle annular conductor along the upper annular conductor 1, a lead portion 12 thereof, and a longitudinal lead 13. Next, the heating electrical power passes along the middle annular conductor 2, a lead portion 22 thereof, a longitudinal lead 23, a lead portion 31 of the lower annular conductor, and the lower annular conductor 3. Furthermore, the heating electrical power reaches a lead portion 34 via a lead portion 32 of the lower annular conductor and a longitudinal lead 33. Accordingly, the three annular conductors 1, 2, and 3 are connected to each other in series, so that a current is allowed to flow in the same direction in the individual annular conductors.

The diameters d1, d2, and d3 of the respective step shaft portions W1, W2, and W3 of the shaft member shown in FIG. 2 have the relationship represented by; d1<d2<d3. When these step shaft portions are heated up by respective annular conductors, the large diameter portion W3 is not easily heated up as compared to the middle diameter portion W2, and as a result, the increase in temperature is slow. On the other hand, since the small diameter portion W1 has a small diameter d1, the temperature thereof is easily increased; however, when one annular conductor corresponding to the shaft length h1 is used, the current density is decreased since the shaft length h1 is large. As a result, compared to the middle diameter portion W2, the small diameter portion W1 is not easily heated up, and the temperature thereof is not easily increased. Hence, in the present invention, the current densities of the annular conductors are set to be approximately proportional to the diameters of portions to be heated so as to obtain uniform increase in temperature of the individual step shaft portions.

In the present invention, as a method for achieving the above-described structure, the lengths of the annular conductors in the axis direction are changed so that the portions to be heated have areas approximately equal to each other in order to obtain uniform increase in temperature of the individual steps. That is, in order to achieve the uniform increase in temperature, basically, the length of the annular conductor corresponding to the large diameter portion is decreased to increase the current density, and the length of the annular conductor corresponding to the small diameter portion is increased to decrease the current density. However, after the lengths of the heating portions are also taken into consideration, the lengths of the individual annular conductors are determined.

In this embodiment, when the work W shown in FIG. 2 is heated up using the three annular conductors, the lengths of the annular conductors in the axis direction are set to H1, H2, and H3 for the diameters d1, d2, and d3 of the step shaft portions, respectively. In addition, as shown in FIG. 2, regions at which the three annular conductors, that is, the upper annular conductor 1, the middle annular conductor 2, and the lower annular conductor 3, are responsible for heating are set to h01, (h11+h2), and h3, respectively.

In the case described above, the inner diameter of the middle annular conductor 2 has a step shape so as to form predetermined gaps with the outer-peripheries of the steps of the work as shown in FIG. 2. By the structure described above, since the amounts of electrical power per heating area applied by the respective conductors become approximately equal to each other, the increases in temperature in heating become uniform, and as a result, the heating efficiency is improved.

In addition, the protrusions 2a and 2b are provided for the middle annular conductor 2 as shown in FIG. 2 at places corresponding to the roots W1a and W2a, respectively, of the steps of the work W so as to heat up the roots W1a and W2a of the steps. In the figure, the protrusion 2a and 2b each have the same inner diameter as that of the second annular conductor 2 and extend downwardly; however, the protrusion 2a and 2b may be formed to annularly extend to the inner circumferential side in the direction toward the roots W1a and W2a of the steps, respectively.

EXAMPLE 1

By using the above heating coil of the present invention, a shaft member having three steps was experimentally heated, the dimensions of the shaft member being represented by the following equation on a millimeter basis.

(diameter $d1 \times h1$)+(diameter $d2 \times h2$)+(diameter $d3 \times h3$)=(diameter 50×80)+(diameter 80×18)+(diameter 130×22).

Heating was performed using a heating coil formed by connecting the three annular conductors as shown in FIG. 2 in series. The lengths of heating portions and the lengths H1, H2, and H3 of the respective annular conductors were set as shown in Table 1.

That is, the middle annular conductor was formed to have a step shape so as to correspond to the two steps as shown in FIG. 2, and as shown in Table 1, the heating areas of the three annular conductors were formed so as to be approximately equal to each other. In addition, the protrusion 2a and 2b were provided for the middle annular conductor 2.

TABLE 1

| | | | (UNIT: mm) |
|---|---|---|---|
| | UPPER ANNULAR CONDUCTOR | MIDDLE ANNULAR CONDUCTOR | LOWER ANNULAR CONDUCTOR |
| HEATING REGION (mm) | $\phi d_1 \times h_{01}$ $\phi 50 \times 53$ | $(\phi d_1 \times h_{11}) + (\phi d_2 \times h_2)$ $(\phi 50 \times 25) + (\phi 80 \times 18)$ | $\phi d_3 \times h_3$ $\phi 130 \times 22$ |
| HEATING AREA mm$^2$ | 8321 | 3924 + 4521 = 8446 | 8980 |
| CONDUCTOR LENGTH (mm) | $H_1$ 50 | $H_2$ 40 | $H_3$ 20 |
| GAP G | 3 | 3 | 3 |

Figure 3:
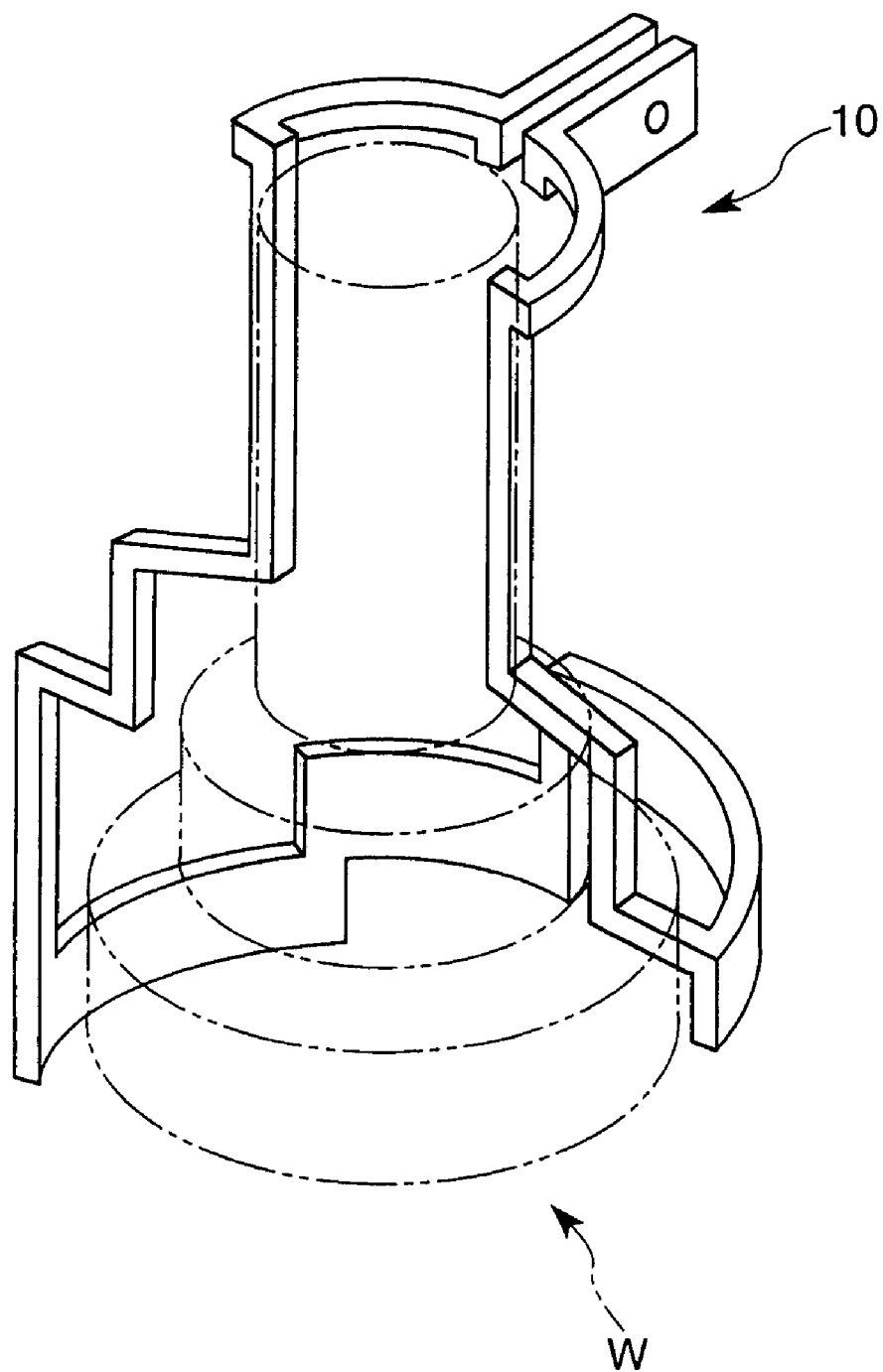
FIG. 3 is a perspective view of a conventional induction heating coil for heating a shaft member having a multiple steps.

By using a conventional heating coil shown in FIG. 3 and the heating coil of the present invention, comparative heating test was performed in which the shaft member having the dimensions described above was heated to a hardening temperature. The results are shown in Table 2.

TABLE 2

| | MAXIMUM APPLIED ELECTRICAL POWER (kW) | TIME REQUIRED TO OBTAIN UNIFORM HARDENING TEMPERATURE (sec) | AMOUNT OF COOLING WATER (l/min) |
|---|---|---|---|
| COIL OF THE PRESENT INVENTION | 360 | 1.8 | 20 |
| CONVENTIONAL COIL | 120 | 3.7 | 10 |

According to the results shown in the table, the time required to obtain a uniform hardening temperature is decreased to approximately one half, the temperature of the coil can be decreased since the amount of cooling water can be increased by 2 times, and by the effects described above and a superior strength of the coil because of its own structure, the service life of the coil can be increased. In addition, by the presence of the protrusions 2a and 2b provided for the middle annular conductor 2, the roots of the shaft can also be sufficiently heated.

As has thus been described, according to the induction heating coil for heating a shaft member having multiple steps, of the present invention, since the above shaft member is heated by the annular conductors disposed around the outer periphery of the shaft member, compared to a conventional heating coil formed of a conductor extending in the axis direction, a large amount of electrical power can be applied, and in addition, the amount of cooling water can be increased; hence, the increase in temperature of the coil can be suppressed, and as a result, the deformation thereof can be prevented. In addition, the lengths of the annular conductors in the axis direction are set so that the areas of the respective heating portions are equal to each other, the increases in temperature of the respective steps of the shaft member become uniform. Hence, compared to a conventional coil, the time required to obtain a uniform temperature of the individual portions can be decreased, a required amount of electrical power is decreases, and as a result, the heating efficiency is improved. Furthermore, because of short-time heating, the hardening deformation is decreased.

When the annular conductors described above are formed to have the shapes and inner diameters in conformity with the shapes and outer diameters of heating portions of the shaft member and are formed to have a step shape corresponding to the steps of the shaft member having different outer diameters, the steps described above tend to be easily and uniformly heated up, and in addition, by providing the annular protrusions for the annular conductor at places corresponding to the roots of the steps of the shaft member, uniform heating can be advantageously performed even for the root portions of the shaft.

INDUSTRIAL APPLICABILITY

According to the induction heating coil for heating a shaft member having multiple steps, of the present invention, since rapid heating can be performed, and the heating time can be decreased, in addition to the decrease in hardening deformation, the heating efficiency is improved, the energy saving can be achieved, and the productivity is improved. In addition, since the service life of the coil is increased, and the cost is decreased, the cost for induction hardening and the like can be reduced, and as a result, a significant contribution is made to the industrial development.

The invention claimed is:

1. An induction heating coil for heating a shaft member having multiple steps, comprising: annular conductors separately disposed in the axis direction and having inner diameters which form predetermined gaps with outer peripheries of heating portions of the shaft member, wherein the lengths of the annular conductors are set so that the areas of the respective heating portions are approximately equal to each other, and the annular conductors are connected to each other in series, wherein at least one of the annular conductors has a step shape corresponding to steps of the shaft member which have different outer diameters so as to uniformly increase temperatures of the step shaft portions of the shaft member.

2. The induction heating coil for heating a shaft member having multiple steps, according to claim 1, wherein at least one annular protrusion is provided for at least one of the annular conductors at a place corresponding to a root of a step of the shaft member so as to also heat the root of the step.

3. An induction heating method for heating a shaft member having multiple steps by using an induction heating coil which comprises annular conductors separately disposed in the axis direction and having inner diameters so as to form predetermined gaps with outer peripheries of heating portions of the shaft member, the lengths of the annular conductors being set so that the areas of the respective heating portions are approximately equal to each other, and the annular conductors being connected to each other in series, wherein at least one of the annular conductors has a step shape corresponding to steps of the shaft member which have different outer diameters so as to uniformly increase temperatures of the step shaft portions of the shaft member.

4. The induction heating method for heating a shaft member having multiple steps by using the induction heating coil, according to claim 3, wherein at least one annular protrusion is provided for at least one of the annular conductors at a place corresponding to a root of a step of the shaft member so as to also heat the root of the step.

* * * * *